(No Model.)
O. MAYER.
ALE AND BEER MEASURE.
No. 406,176. Patented July 2, 1889.
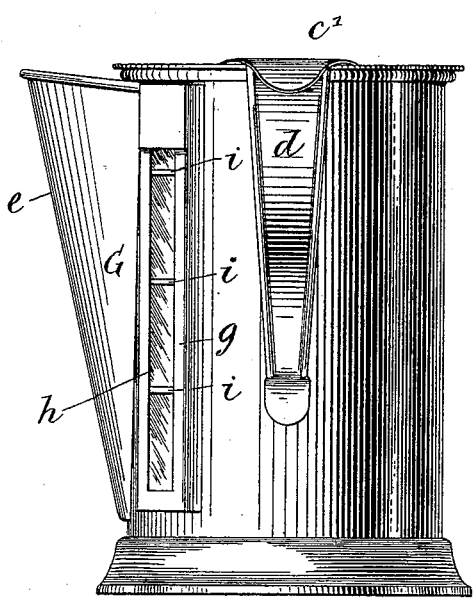
Fig: 1.
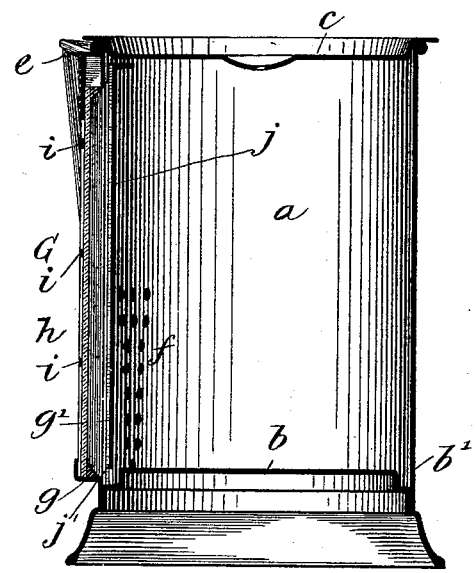
Fig: 2.
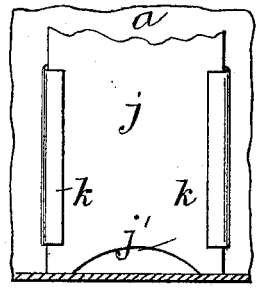
Fig: 4.
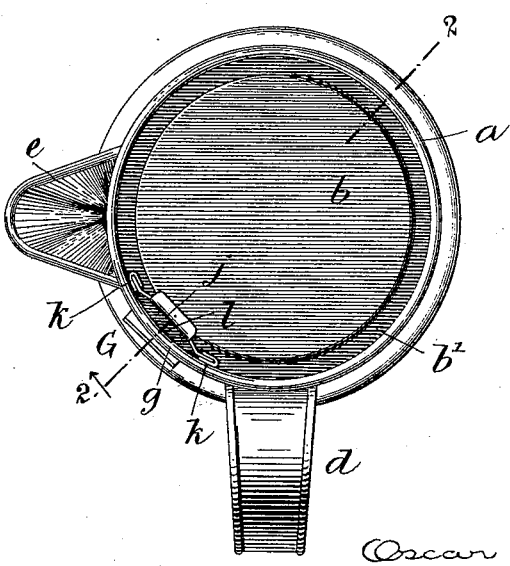
Fig: 3.
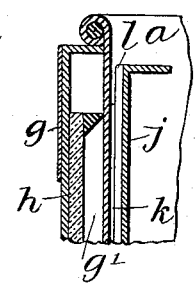
Fig: 5.
WITNESSES:
John A. Rennie.
J. D. Caplinger
INVENTOR:
Oscar Mayer,
Henry Connett
By
Attorney.

UNITED STATES PATENT OFFICE.

OSCAR MAYER, OF NEW YORK, N. Y.

ALE OR BEER MEASURE.

SPECIFICATION forming part of Letters Patent No. 406,176, dated July 2, 1889.

Application filed May 10, 1889. Serial No. 310,284. (No model.)

*To all whom it may concern:*

Be it known that I, OSCAR MAYER, a citizen of the United States, and a resident of the city, county, and State of New York, have invented certain Improvements in Ale or Beer Measures, of which the following is a specification.

My invention relates to that class of receptacles for ale, beer, and the like which are provided with graduated-gage devices to show the quantity of the liquid therein; and the object of my invention is to simplify the construction of the measure, to cheapen it and improve its operation, and to leave the interior of the measure free from obstructions, so that it may be conveniently cleansed.

In the drawings which serve to illustrate my invention, Figure 1 is a side elevation of the measure. Fig. 2 is a vertical section of the same in the plane indicated by the line 2 2 in Fig. 3. Fig. 3 is a plan view of the measure without its cover. Figs. 4 and 5 are fragmentary detail views.

$a$ is the cylindrical body of the measure. $b$ is the bottom thereof, and $c$ is the loose removable cover thereof, provided with a thumb-piece $c'$, which rests on the handle $d$ of the measure. $e$ is the spout of the measure, which extends down to near the bottom of the body $a$, and at $f$, Fig. 2, may be seen the perforations in the body $a$ through which the liquid passes to the spout. All of these features are common to this class of measures.

The measure is provided with a graduated gage, (designated by G as a whole.) To this gage the present invention relates.

In constructing the gage a longitudinal narrow aperture is formed in the side wall of the body $a$, extending nearly from top to bottom, and to the exterior face of the body $a$ and embracing said narrow aperture is secured, usually with solder, an open-faced projecting sheet-metal casing $g$, the opening in the front of which is closed by a plate $h$, of glass or similar transparent material. This glass will be secured in place by putty, cement, or the like, and the front of the casing will have suitable graduations $i$ to indicate the quantity of liquid in the measure. The liquid has access to the gage-chamber $g'$ within this casing and may be seen through the transparent plate $h$.

Heretofore measures for ale or beer have had graduated gages similar to that just described, and in order that the liquid in the measure shall only enter at the bottom of the chamber in the gage and the froth and foam be excluded these measures have had sliding covers adapted to cut off all communication between said chamber and the body of the measure, except by way of a specially-provided passage at or near the bottom of the measure. The objection to these has been that they retain more or less of the ale or beer in the contracted passages and receptacles formed in the interior of the measure, are difficult to cleanse and keep clean, and these measures are comparatively expensive to construct. The present construction obviates these difficulties. The bottom $b$ of the measure is raised at its center, leaving an annular channel or depression $b'$ next the wall of the vessel, and the gage-chamber $g'$ extends down to or nearly to the bottom of this channel. A slide $j$, the edges of which engage and play in keepers $k$ $k$ on the inner face of the body $a$, cuts off communication between the body of the measure and the gage-chamber, except at the bottom of the latter, where the liquid passes from the channel $b'$ under the end of the slide $j$, which is cut away at its lower end, as seen at $j'$ in Fig. 4, to form a restricted passage for the same.

When beer or ale is drawn from the barrel into the measure, the channel $b'$ is instantly filled with solid liquid, which at once seals the aperture at $j'$ and prevents any floating froth from entering the gage-chamber $g'$. As the measure fills up, the liquid rises in the air at the top of same through the space or opening seen at $l$, in Fig. 3 between the upper end of the slide $j$ and the rim of the body $a$ above the gage. This mode of constructing air-outlets at $l$ obviates the necessity of providing special air-eduction tubes, such as are found in some measures of this character. Tubes of this kind are liable to become clogged and are difficult to cleanse. The outlet at $l$ being formed in part by the wall of the body $a$ and in part by the slide $j$, it is only necessary to draw out the slide, when the passage may be thoroughly cleansed. The communication between the gage-chamber $g'$ and the air-outlet $l$ is best illustrated in the enlarged sectional view, Fig. 5. The slide $j$, being simply a smooth plate, is easily cleansed, and when it is drawn out the whole interior, including the gage-chamber, is left exposed and free from obstructions and perfect access is provided for thorough cleansing. This is all the more important in measures for glutinous liquids, like beer or ale.

The slide $j$ is represented as slightly convex on its inner face; but it may be flat. The graduation-marks $i$ are represented as parts of the casing $g$, extending across the plate $h$; but these marks may be ground on the glass in a well-known way.

Having thus described my invention, I claim—

1. The combination, with the body of the measure and the gage G thereon, of the plain removable slide $j$, mounted in keepers on the inner face of the body and serving as a partition between the gage-chamber $g'$ and the interior of the measure, said slide being cut away at $j'$ to form a contracted passage for the liquid from the measure to the gage-chamber and standing out of contact with the wall of the body $a$ at its upper end, whereby the outlet $l$ is formed for the escape of air from the gage-chamber, as set forth.

2. The combination, with the body of the measure having a depressed annular portion or channel $b'$ in its bottom $b$, and the gage G, the chamber in which extends below the level of the bottom $b$, of the plain removable slide $j$, mounted in keepers on the inner face of the body and serving as a partition between the gage-chamber and the interior of the measure, said slide having a contracted passage under its lower end connecting the channel $b'$ with the gage-chamber, as set forth.

In witness whereof I have hereunto signed my name in the presence of two subscribing witnesses.

OSCAR MAYER.

Witnesses:
 HENRY CONNETT,
 J. D. CAPLINGER.